United States Patent
Sekiguchi et al.

(10) Patent No.: US 9,904,997 B2
(45) Date of Patent: Feb. 27, 2018

(54) IMAGE PROCESSING APPARATUS, IMAGE PROCESSING METHOD AND STORAGE MEDIUM FOR EXTRACTING A LESION HAVING A GROUND GLASS OPACTIY

(71) Applicant: CANON KABUSHIKI KAISHA, Tokyo (JP)

(72) Inventors: Hiroyuki Sekiguchi, Kyoto (JP); Akinobu Shimizu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/955,049

(22) Filed: Jul. 31, 2013

(65) Prior Publication Data

US 2014/0037170 A1 Feb. 6, 2014

(30) Foreign Application Priority Data

Aug. 3, 2012 (JP) ................................. 2012-173396

(51) Int. Cl.
*G06T 7/00* (2006.01)
(52) U.S. Cl.
CPC .. *G06T 7/0012* (2013.01); *G06T 2207/10081* (2013.01); *G06T 2207/10088* (2013.01); *G06T 2207/20072* (2013.01); *G06T 2207/20081* (2013.01); *G06T 2207/30064* (2013.01); *G06T 2207/30096* (2013.01)

(58) Field of Classification Search
None
See application file for complete search history.

(56) References Cited

U.S. PATENT DOCUMENTS

| 8,045,770 B2* | 10/2011 | Reeves | G06T 7/0012 |
| | | | 382/128 |
| 2002/0159635 A1* | 10/2002 | Hill | G06K 9/32 |
| | | | 382/173 |
| 2003/0179915 A1* | 9/2003 | Goto | A61B 6/463 |
| | | | 382/128 |

(Continued)

FOREIGN PATENT DOCUMENTS

| JP | 2002-325761 A | 11/2002 |
| JP | 2009-502232 A | 1/2009 |
| WO | 2004/109580 A2 | 12/2004 |

OTHER PUBLICATIONS

K. Okada: Ground-Glass Nodule Characterization in High-Resolution CT Scans, In Lung Imaging and Computer Aided Diagnosis, Taylor and Francis, LLC, 2011.

(Continued)

*Primary Examiner* — Matthew Bella
*Assistant Examiner* — Soo Shin
(74) *Attorney, Agent, or Firm* — Carter, DeLuca, Farrell & Schmidt, LLP

(57) ABSTRACT

An image processing apparatus which extracts a lesion having a ground glass opacity from an image includes a change unit which changes a pixel value corresponding to a candidate region for the ground glass opacity to a predetermined pixel value range, a first feature amount extraction unit which obtains a first feature amount from the image, the pixel value of which is changed, and an extraction unit which extracts the lesion from the image based on the first feature amount.

22 Claims, 10 Drawing Sheets

(56) References Cited

U.S. PATENT DOCUMENTS

| | | | | |
|---|---|---|---|---|
| 2003/0194124 | A1* | 10/2003 | Suzuki | G06T 7/0012 382/156 |
| 2004/0086162 | A1* | 5/2004 | Doi | G06T 7/0012 382/131 |
| 2006/0093216 | A1* | 5/2006 | Odry | G06T 7/0012 382/173 |
| 2006/0153451 | A1* | 7/2006 | Hong | G06T 7/0012 382/173 |
| 2007/0286469 | A1* | 12/2007 | Yamagata | G06T 7/0012 382/131 |
| 2009/0129673 | A1* | 5/2009 | Simon | G06T 7/0012 382/173 |
| 2011/0075920 | A1* | 3/2011 | Wu | G06K 9/4638 382/160 |

OTHER PUBLICATIONS

T. Okada, et al.: Computer-aided diagnosis of lung cancer: definition and detection of ground-glass opacity type of nodules by high-resolution computed tomography, Japan Radiological Society, 27:91-99, 2009.

Y. Boykov, et al.: Interactive Graph Cuts for Optimal Boundary & Region Segmentation of Objects in N-D Images, In IEEE Int. Conf. on Computer Vision, 1:105-112, 2001.

H. Ishikawa: Graph Cuts, Research Report by Information Processing Society of Japan, CVIM, 158: 193-204, 2007.

M. Takagi, et al.: Image Analysis Handbook, New Edition, Tokyo University Press, Tokyo, 2004, 1260-1265.

H. Kanamori, et al.: Commentary of Boosting and Its Increase in Robustness, The Journal of the Institute of Electronics, Information and Communication Engineers, 86, 10: 769-772, 2003.

T. Narihira, et al.: Boosting algorithms for segmentation of metastatic liver tumors in contrast-enhanced computed tomography, Int. J. CARS 2009, 4: S318, 2009.

Jinghao Zhou et al.: "Automatic Detection and Segmentation of Ground Glass Opacity Nodules," Jan. 1, 2006, Medical Image Computing and Computer-Assisted Intervention (MICCAI 2006); Lecture Notes in Computer Science; Springer, Berlin, DE, pp. 784-791.

Yuanjie Zheng et al.: "Estimation of Ground-Glass Opacity Measurement in CT Lung Images," Sep. 6, 2008, Medical Image Computing and Computer-Assisted Intervention (MICCAI 2008); Lecture Notes in Computer Science; Springer Berlin Heidelberg, Berlin, Heidelberg, pp. 238-245.

Yimo Tao et al.: "Multi-level Ground Glass Nodule Detection and Segmentation in CT Lung Images," Sep. 20, 2009, Medical Image Computing and Computer-Assisted Intervention (MICCAI 2009); Springer Berlin Heidelberg, Berlin, Heidelberg, pp. 715-723.

Extended European search report issued on Dec. 6, 2013, in counterpart European Application No. 13179484.4.

Japanese Office Action dated Jul. 28, 2017 in corresponding Japanese Patent Application No. 2016-162204 together with English translation, 6 pages.

* cited by examiner

- CALCULATION AREA FOR BACKGROUND INTENSITY
- CALCULATION AREA FOR GGO INTENSITY

FIG. 10A
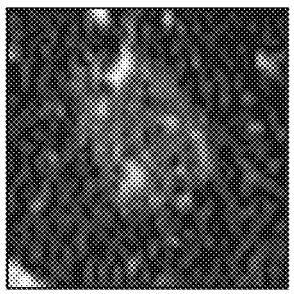
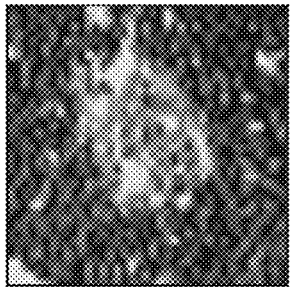
Pure GGO (1)
FIG. 10B
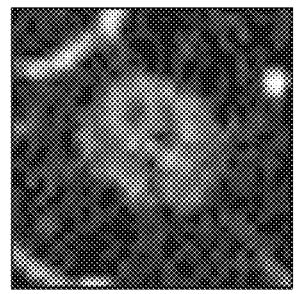
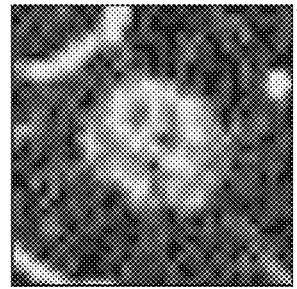
Pure GGO (2)
FIG. 10C
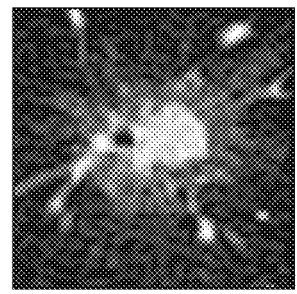
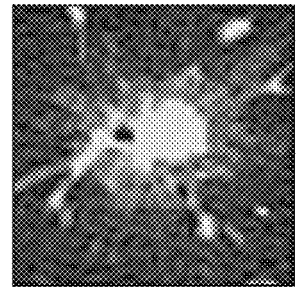
Mixed GGO

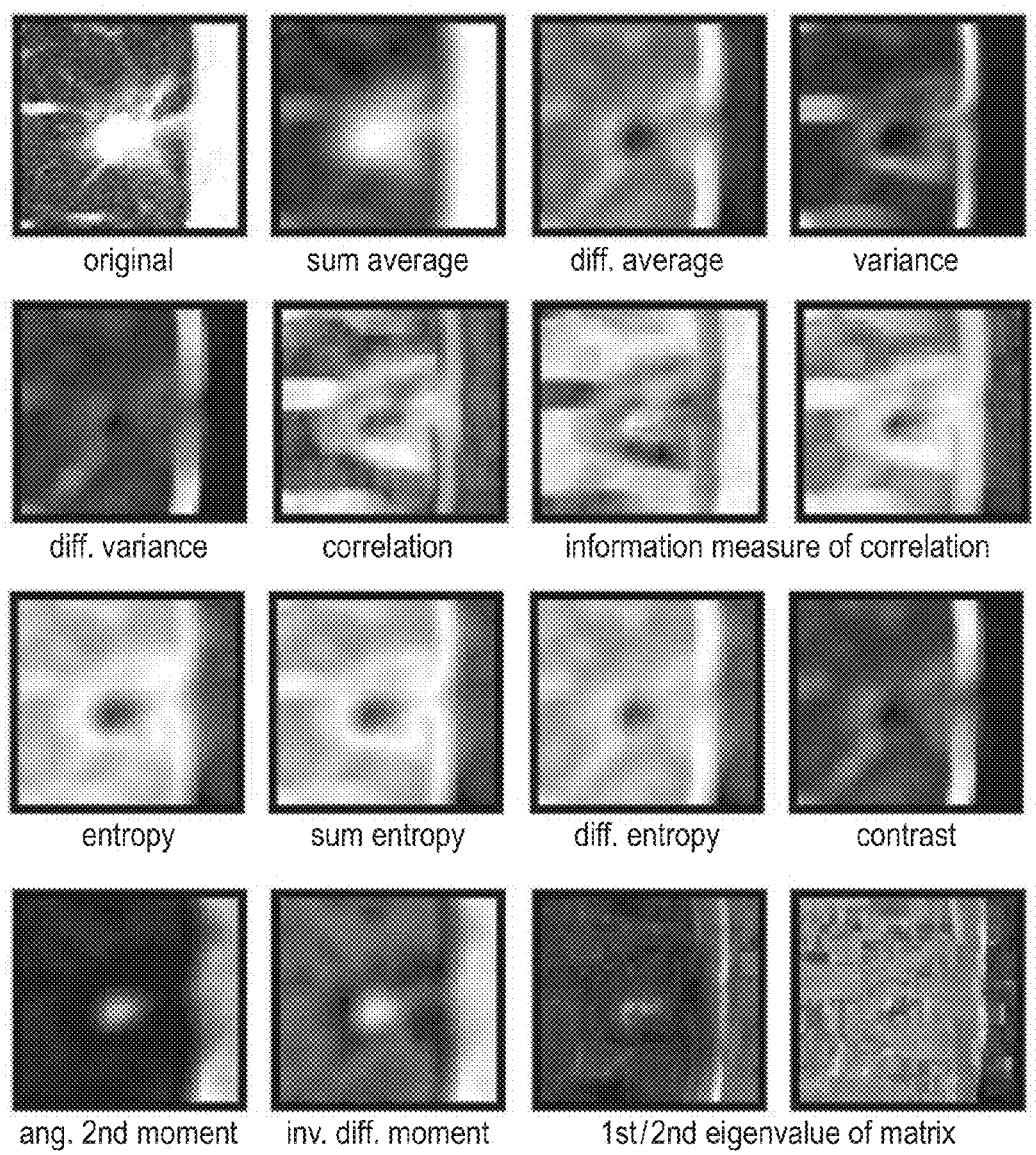

FIG. 12A
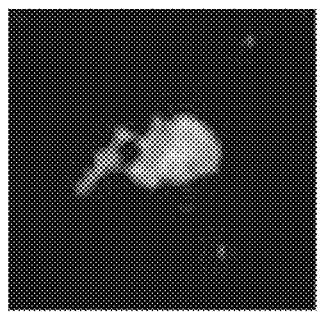
FIG. 12B
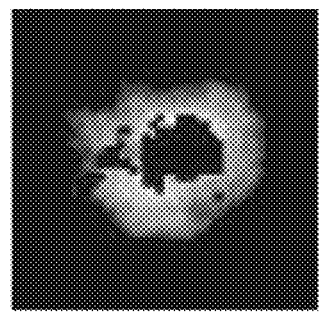
FIG. 12C
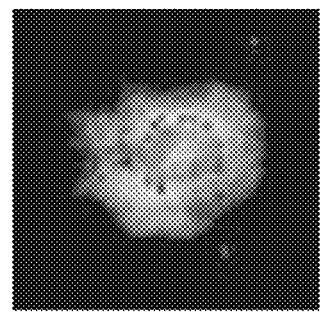
FIG. 13
Solid nodule
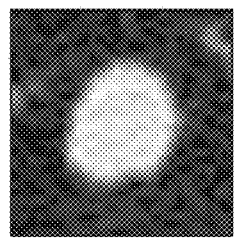 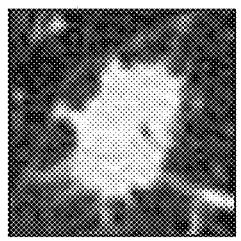
GGO nodule
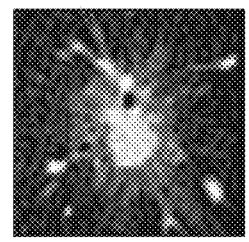 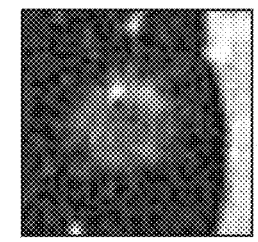
Mixed GGO    Pure GGO

IMAGE PROCESSING APPARATUS, IMAGE PROCESSING METHOD AND STORAGE MEDIUM FOR EXTRACTING A LESION HAVING A GROUND GLASS OPACTIY

BACKGROUND OF THE INVENTION

Field of the Invention

The present invention relates to an image processing technique of acquiring a lesion region from an image.

Description of the Related Art

As the radiologist's burden of interpretation of radiogram increases each year, the expectation for CAD (Computer Aided Diagnosis) soars increasingly. The grade of malignancy of a pulmonary nodule is determined based on, for example, the shape feature of the nodule, so it is important to accurately extract a nodule region in differential diagnosis (CADx) by a computer. FIG. 13 illustrates an example of pulmonary nodule images. The two left views show solid nodules, and the two right views show nodules (to be also sometimes referred to as "GGOs (Ground Glass Opacities)" hereinafter) having GGOs. Especially, it is highly probable that a nodule ("GGO") having a ground glass opacity is a malignant lesion such as adenocarcinoma, so a demand has arisen for highly reliable region extraction processing for a GGO.

However, a nodule ("GGO") having a ground glass opacity that is expected to be malignant at a high probability has a vague boundary, so highly accurate region extraction is difficult.

To solve this problem, non-patent literature 1 proposes a method of approximating a GGO region by anisotropic Gaussian fitting.

Also, non-patent literature 2 shows a method of experimentally obtaining the density ranges of a substantial portion and GGO region from the AUC value of an ROC curve, and performing segmentation of the GGO region and substantial portion by threshold processing.

On the other hand, according to non-patent literatures 3 and 4, an algorithm for segmentation using graph cuts is actively under study in recent years. In the case of, for example, a solid nodule, a nodule region can be accurately extracted by directly applying graph cuts to a CT image. However, in the case of a GGO, this operation is not easy because the boundary is vague.

In the method described in non-patent literature 1, to obtain a robust result, a nodule region is approximated not for each pixel but as an ellipsoid. This operation is useful in, for example, deriving a rough temporal change rate of the nodule size, while information associated with the detailed shape cannot be obtained.

In the method described in non-patent literature 2, the densities of respective regions overlap each other, so there is a limit in separation of each region (the interval between the background and the GGO region, and that between the substantial portion and the blood vessel/chest wall) by only threshold processing. Also, problems resulting from low resistance against noise and variations in imaging condition are posed.

[Non-patent Literature 1] K. Okada: Ground-Glass Nodule Characterization in High-Resolution CT Scans. In Lung Imaging and Computer Aided Diagnosis, Taylor and Francis, LLC, 2011

[Non-patent Literature 2] T. Okada, S. Iwano, T. Ishigaki, et al: Computer-aided diagnosis of lung cancer: definition and detection of ground-glass opacity type of nodules by high-resolution computed tomography. Japan Radiological Society, 27:91-99, 2009

[Non-patent Literature 3] Y. Boykov, M. P. Jolly: Interactive Graph Cuts for Optimal Boundary & Region Segmentation of Objects in N-D Images. In IEEE Int. Conf. on Computer Vision, 1:105-112, 2001

[Non-patent Literature 4] H. Ishikawa: Graph Cuts. Research Report by Information Processing Society of Japan, CVIM, 158: 193-204, 2007

[Non-patent Literature 5] M. Takagi, H. Shimoda: Image Analysis Handbook, New Edition, Tokyo University Press, Tokyo, 2004, 1260-1265

[Non-patent Literature 6] H. Kanamori, N. Murata: Commentary of Boosting and Its Increase in Robustness. The Journal of the Institute of Electronics, Information and Communication Engineers, 86, 10: 769-772, 2003

[Non-patent Literature 7] T. Narihira, A. Shimizu, H. Kobatake, et al: Boosting algorithms for segmentation of metastatic liver tumors in contrast-enhanced computed tomography. Int. J CARS 2009, 4: S318, 2009

SUMMARY OF THE INVENTION

The present invention has been made in consideration of the above-mentioned problems, and provides an image processing technique of accurately extracting a lesion with a light shade.

According to one aspect of the present invention, there is provided an image processing apparatus which extracts a lesion having a ground glass opacity from an image, the apparatus comprising: a change unit configured to change a pixel value corresponding to a candidate region for the ground glass opacity to a predetermined pixel value range; a first feature amount extraction unit configured to obtain a first feature amount from the image, the pixel value of which is changed by the change unit; and an extraction unit configured to extract the lesion from the image based on the first feature amount.

According to another aspect of the present invention, there is provided an image processing apparatus which extracts information of a lesion region having a light shade from image data, the apparatus comprising: a change unit configured to change a pixel value of the image data corresponding to a candidate region for the light shade to a predetermined pixel value range; a feature amount calculation unit configured to calculate a first texture feature amount corresponding to a light shade for each pixel based on the pixel value of the image data, the pixel value of which is changed, and calculating a second texture feature amount corresponding to a substantial portion that forms a core with the light shade for each pixel based on the pixel value of the image data, the pixel value of which is not changed; a first identifying unit configured to output a value corresponding to the light shade for each pixel based on the first texture feature amount; a second identifying unit configured to output a value corresponding to a substantial portion that forms a core of the lesion region for each pixel based on the second texture feature amount; and a region extraction unit configured to extract coordinate information of a pixel of the image data corresponding to a region of the lesion region using a graph cut from image data combined based on information of values output from the first identifying unit and the second identifying unit.

According to still another aspect of the present invention, there is provided an image processing apparatus which extracts a lesion region from an image, the apparatus comprising: a selection unit configured to select whether the lesion is a lesion having a ground glass opacity or a lesion different from the lesion having the ground glass opacity; and an extraction unit configured to extract, if the lesion having the ground glass opacity is selected, the lesion region from the image based on a feature amount of the image in which a pixel value range of a candidate region for the ground glass opacity is changed to a predetermined pixel value range, and extracting, if the lesion different from the lesion having the ground glass opacity is selected, the lesion region from the image based on a feature amount of the image.

According to yet another aspect of the present invention, there is provided an image processing method of extracting a lesion having a ground glass opacity from an image, the method comprising: a change step of changing a pixel value corresponding to a candidate region for the ground glass opacity to a predetermined pixel value range; and an extraction step of extracting the lesion from the image based on a feature amount obtained from the image, the pixel value of which is changed.

According to the present invention, it is possible to accurately extract a lesion with a light shade.

Further features of the present invention will become apparent from the following description of exemplary embodiments with reference to the attached drawings.

BRIEF DESCRIPTION OF THE DRAWINGS

FIGS. 10A to 10C are views showing GGO nodule images before and after a change in pixel value range;

FIG. 11 shows views of examples of Haralick texture statistics;

FIGS. 12A to 12C are views illustrating examples of enhanced images; and

FIG. 13 shows views of examples of GGO nodule images.

DESCRIPTION OF THE EMBODIMENTS

Embodiments of an image processing apparatus and method according to the present invention will be described in detail below with reference to the accompanying drawings. However, constituent elements described in the embodiments are merely examples, and the technical scope of the present invention is determined by the scope of claims and is not limited by the following individual embodiments.

[First Embodiment]

Figure 1:
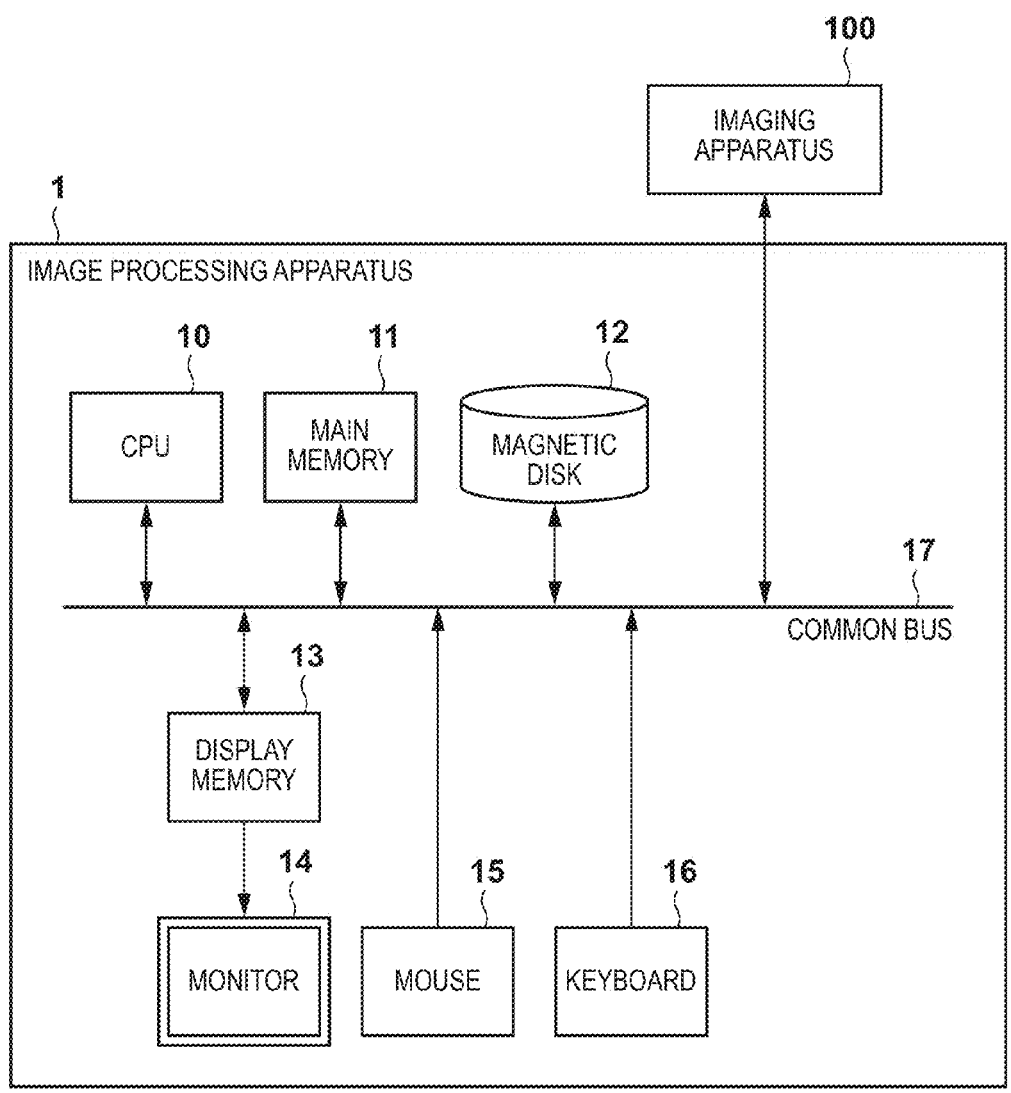
FIG. 1 is a block diagram showing the entire system of an image processing apparatus.

FIG. 1 is a block diagram illustrating an example of the configuration of an image processing system including an image processing apparatus 1, and an imaging apparatus 100 connected to it according to the first embodiment. The image processing apparatus 1 can be implemented by, for example, a personal computer (PC), and includes a central processing unit (CPU) 10, main memory 11, magnetic disk 12, display memory 13, monitor 14, mouse 15, and keyboard 16.

The CPU 10 mainly controls the operation of each constituent element of the image processing apparatus 1. The main memory 11 stores a control program to be executed by the CPU 10, and provides a work area in program execution by the CPU 10. The magnetic disk 12 stores, for example, various types of application software including an operating system (OS), device drivers of peripheral devices, and a program for executing, for example, deformation estimation processing (to be described later). The display memory 13 temporarily stores display data for the monitor 14. The monitor 14 is, for example, a CRT monitor or a liquid crystal monitor, and displays an image based on the data from the display memory 13. The mouse 15 and keyboard 16 are used to perform pointing input and input of, for example, texts by the user. The above-mentioned constituent elements are communicably connected to each other via a common bus 17.

The image processing apparatus 1 is connected to the imaging apparatus 100 via a local area network (LAN), and can acquire image data from the imaging apparatus 100. Note that the mode of the present invention is not limited to this, and the devices in the image processing apparatus 1 and the imaging apparatus 100 may be connected to each other via a USB or another interface such as IEEE1394. Alternatively, the image processing apparatus 1 may be configured to read, via, for example, a LAN, necessary data from a data server which manages these data. Again, the image processing apparatus 1 may be connected to a storage device such as an FDD, a CD-RW drive, an MO drive, or a ZIP drive, and read necessary data from these drives.

The imaging apparatus 100 uses, for example, CT, MRI, or digital radiography in which a two-dimensional radiation image is captured. In this embodiment, CT will be taken as an example hereinafter.

Figure 2:
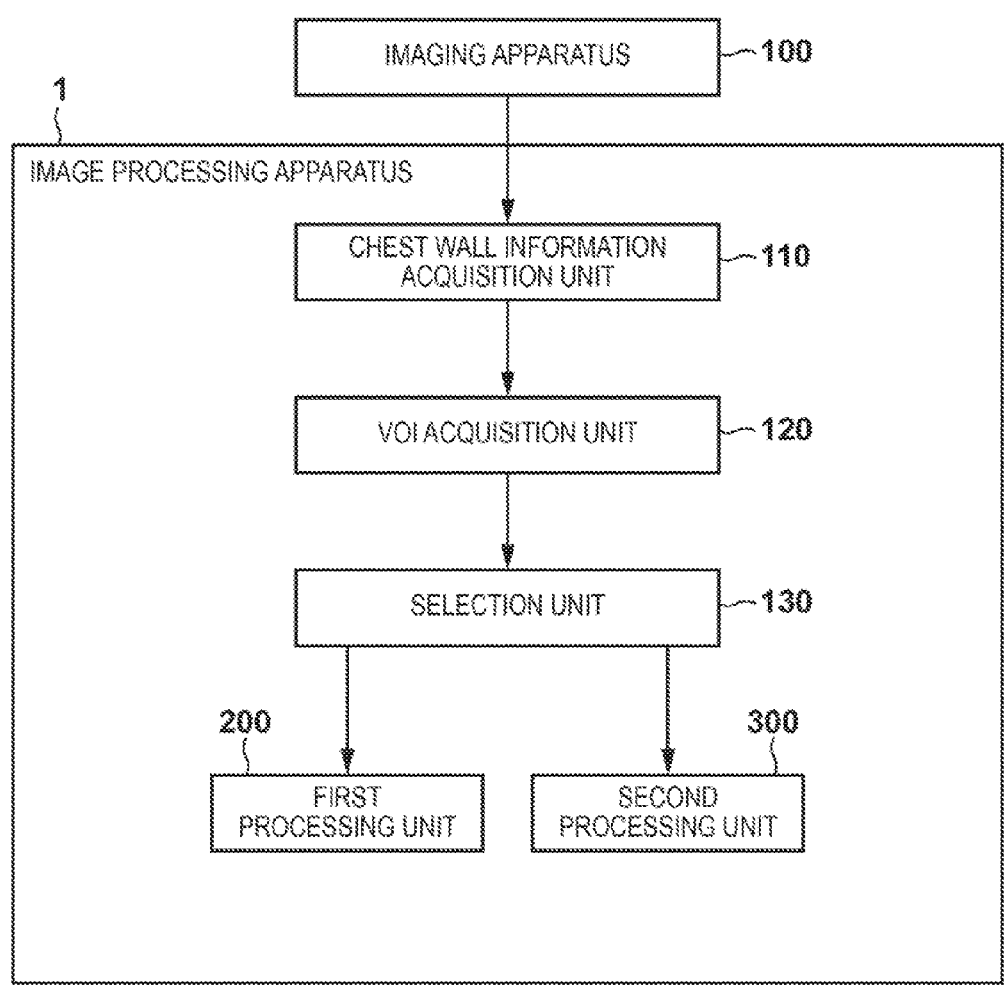
FIG. 2 is a block diagram showing the functional configuration of the image processing apparatus.

FIG. 2 shows the functional configuration of the image processing apparatus 1 according to this embodiment. This embodiment exemplifies a three-dimensional chest image captured by CT. However, this configuration is also applicable to, for example, MRI or a two-dimensional radiation image.

A chest wall information acquisition unit 110 shown in FIG. 2 performs three-dimensional chest image lung field extraction processing to obtain chest wall information. A VOI acquisition unit 120 shown in FIG. 2 acquires, from an image of an object, a VOI as an image region of interest, obtained by removing a region other than the lung field, using chest wall information.

A selection unit 130 selects the type of lesion. Note that "Mixed GGO" is the second nodule from the right end of FIG. 13, and is a nodule having a substantial portion and ground glass opacity which form a core serving as a high pixel value region (to be also sometimes referred to as "Mixed GGO" hereinafter). On the other hand, the nodule at the right end of FIG. 13 is a nodule having a main nodule region formed by a ground glass opacity region (to be referred to as "Pure GGO" hereinafter). In this embodiment, the selection unit 130 selects whether the type of nodule is "Mixed GGO", "Pure GGO", or "Solid nodule" as a lesion other than a GGO.

A first processing unit 200 performs extraction processing of a lesion region when "Mixed GGO" or "Pure GGO" is selected. Also, a second processing unit 300 performs extraction processing of a lesion region when "Solid nodule" as a lesion other than a GGO is selected.

Figure 3:
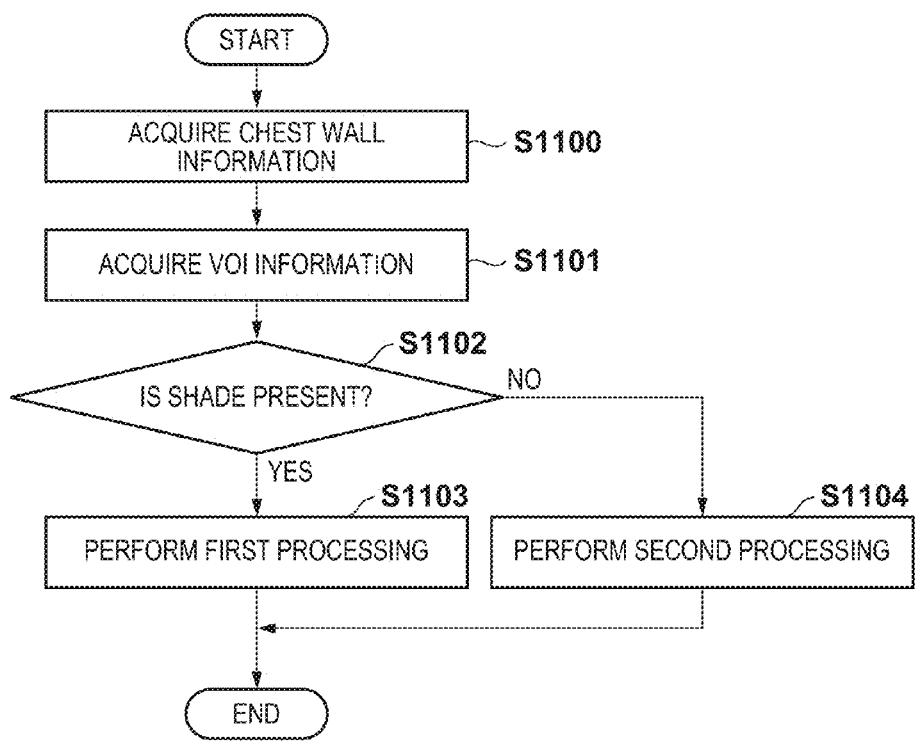
FIG. 3 is a flowchart showing the entire processing of the image processing apparatus.

The sequence of an image processing method for the image processing apparatus 1 will be described below with reference to FIG. 3.

(S1100)

In step S1100, the chest wall information acquisition unit 110 extracts a lung field region using the technique described in non-patent literature 6. The chest wall information acquisition unit 110 stores the position of the outer wall of the lung field region in the main memory 11 as coordinate information.

(S1101)

Figure 4:
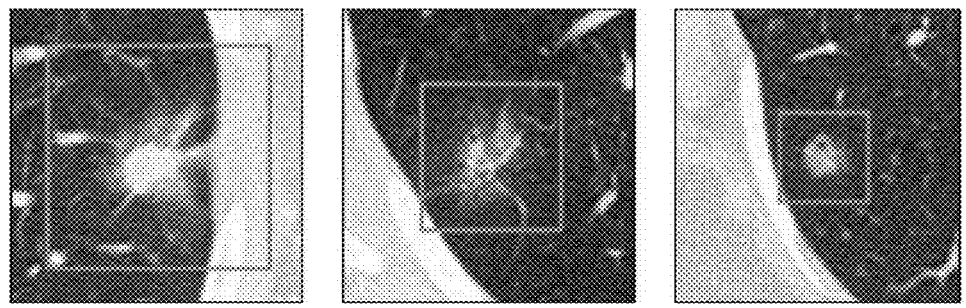
FIG. 4 shows views of image regions (VOIs) including lesion regions.

In step S1101, the VOI acquisition unit 120 acquires a rectangular parallelepiped surrounding a nodule as a VOI while looking up Axial, Sagittal, and Coronal cross-sectional images. Note that the VOI acquisition unit 120 extracts a rough isolated shadow. This extraction is merely extraction of a rough region, and is not highly accurate extraction of the contour of a lesion. This VOI may be automatically extracted, or manually input via the mouse 15 while looking up Axial, Sagittal, and Coronal cross-sectional images displayed on the monitor 14. As shown in rectangular frames of FIG. 4, the length of one side is set to be about twice the average diameter of a nodule. When a VOI is acquired by manual input, an unnecessary region is deleted from the VOI in accordance with the coordinate information of the position of the outer wall of the lung field region stored in the main memory 11. Automatic extraction processing of a VOI can be done using a generally known technique of extracting an isolated shadow.

(S1102)

In step S1102, the selection unit 130 selects the type of nodule (the presence/absence of a light shade). For example, the selection unit 130 extracts, as a core region, a region having a CT value $\theta_{th}=-194$ or more, and selects whether the type of nodule is "Mixed GGO", "Pure GGO", or "Solid nodule" (a nodule having no ground glass opacity) as a lesion other than a GGO, based on the ratio between the core region and the VOI region. A high or low density as the density representation of an image is represented as a density level corresponding to the pixel value of image data. Note that the pixel value in CT image data corresponds to a CT value. Alternatively, the selection unit 130 may allow the examiner to select the type of lesion (the type of nodule in this embodiment) using the mouse 15 or keyboard 16.

(S1103)

In step S1103, the first processing unit 200 performs extraction processing of a lesion region when "Mixed GGO" or "Pure GGO" is selected. Note that "Mixed GGO" formed by a ground glass opacity region, and a substantial region (to be also sometimes referred to as the "core portion" hereinafter) that forms the core have large differences in property within a region included in the nodule, in terms of both the density and texture. Especially, the range of the pixel value of the ground glass opacity region has a large variation in each individual nodule. Therefore, the first processing unit 200 obtains a texture feature amount for each pixel from an image obtained by changing the pixel value range of candidate regions (other than high pixel value regions such as the core region and blood vessel region, and the background region) for ground glass opacity regions to a predetermined pixel value range. The first processing unit 200 performs enhancement processing of obtaining an output value for each pixel by first conversion processing based on a plurality of texture feature amounts. The enhancement processing means herein, for example, processing of applying, to pixels in the ground glass opacity region, a numerical value larger than those of pixels in the remaining region. This makes it easy to identify a ground glass opacity region from the remaining region.

The first conversion processing can be done using a function that deforms a plurality of input values into a non-linear value and outputs it as one output value. Such a function is set to associate the relationship between the input value and the output value, and the constituent process will be referred to as learning hereinafter. The first processing unit 200 can obtain ground glass opacity region information of "Mixed GGO" with high resolution based on the output value obtained by the first conversion processing.

Note that the average $\theta_{th}=-194$ of values determined as the minimum density value of the high density core portion when five radiologists independently conduct examinations in advance using 12 cases is used as a threshold. Also, the first processing unit 200 extracts a "Pure GGO" region when "Pure GGO" is selected. A difference in processing from "Mixed GGO" lies in that second conversion processing for "Pure GGO" different from the first conversion processing is performed as conversion processing of performing enhancement processing. The enhancement processing means herein, for example, processing of applying, to pixels in the ground glass opacity region, a numerical value larger than those of pixels in the remaining region. For example, the first conversion processing is done using a function learned using a feature amount obtained from the ground glass opacity region of "Mixed GGO" of an image changed to a predetermined pixel value range. Also, the second conversion processing is done using a function learned using a feature amount obtained from the ground glass opacity region of "Pure GGO" of an image changed to a predetermined pixel value range. This makes it easy to identify a ground glass opacity region from the remaining region.

In "Pure GGO" as well, portions including high density regions such as a blood vessel and calcified lesion are present. Therefore, the first processing unit 200 obtains a texture feature amount for each pixel from an image obtained by changing the pixel value range of candidate regions (other than high pixel value regions such as the core region and blood vessel region, and the background region) for ground glass opacity regions to a predetermined pixel value range. The first processing unit 200 obtains an output value for each pixel by second conversion processing, based on the texture feature amount. The first processing unit 200 can obtain ground glass opacity region information of "Pure GGO" as well with high resolution based on the output value.

With this operation, by changing the image enhancement method between "Pure GGO" and "Mixed GGO", ground glass opacity region information can be extracted with high resolution in the two lesions. The extraction of region information means herein obtaining position information associated with a region from image data. Also, information required to express a region, extracted as an image, on an image as a region different from the remaining region is also defined as region information. This makes it possible to obtain lesion contour information, area information, shape information, and information for an image change using the region information.

(S1104)

In step S1104, the second processing unit 300 extracts a "Solid nodule" region if "Solid nodule" is selected as a lesion other than a GGO. The second processing unit 300 obtains a texture feature amount for each pixel from an image obtained by not changing the pixel value range of the image. The second processing unit 300 performs enhancement processing of obtaining an output value for each pixel by third conversion processing for another lesion, based on the texture feature amount. The enhancement processing means herein, for example, processing of applying, to pixels in the "solid module" region, a numerical value larger than those of pixels in the remaining region. This makes it easy to identify a nodule region from the remaining region. The second processing unit 300 can obtain "Solid nodule" region information as another lesion with high resolution based on the output value obtained by the third conversion processing. The third conversion processing is done using a function learned using a feature amount obtained from a "Solid nodule" region.

With this operation, in the first embodiment, by changing the change method and enhancement method of the pixel value range in accordance with the type of lesion, the extraction accuracy of lesions, including a lesion with a light shade, can be improved.

[Second Embodiment]

In the second embodiment, processing by a first processing unit 200 will be described in detail, and the same reference numerals as in the first embodiment denote the same constituent elements, so a description thereof will not be given.

Figure 5:
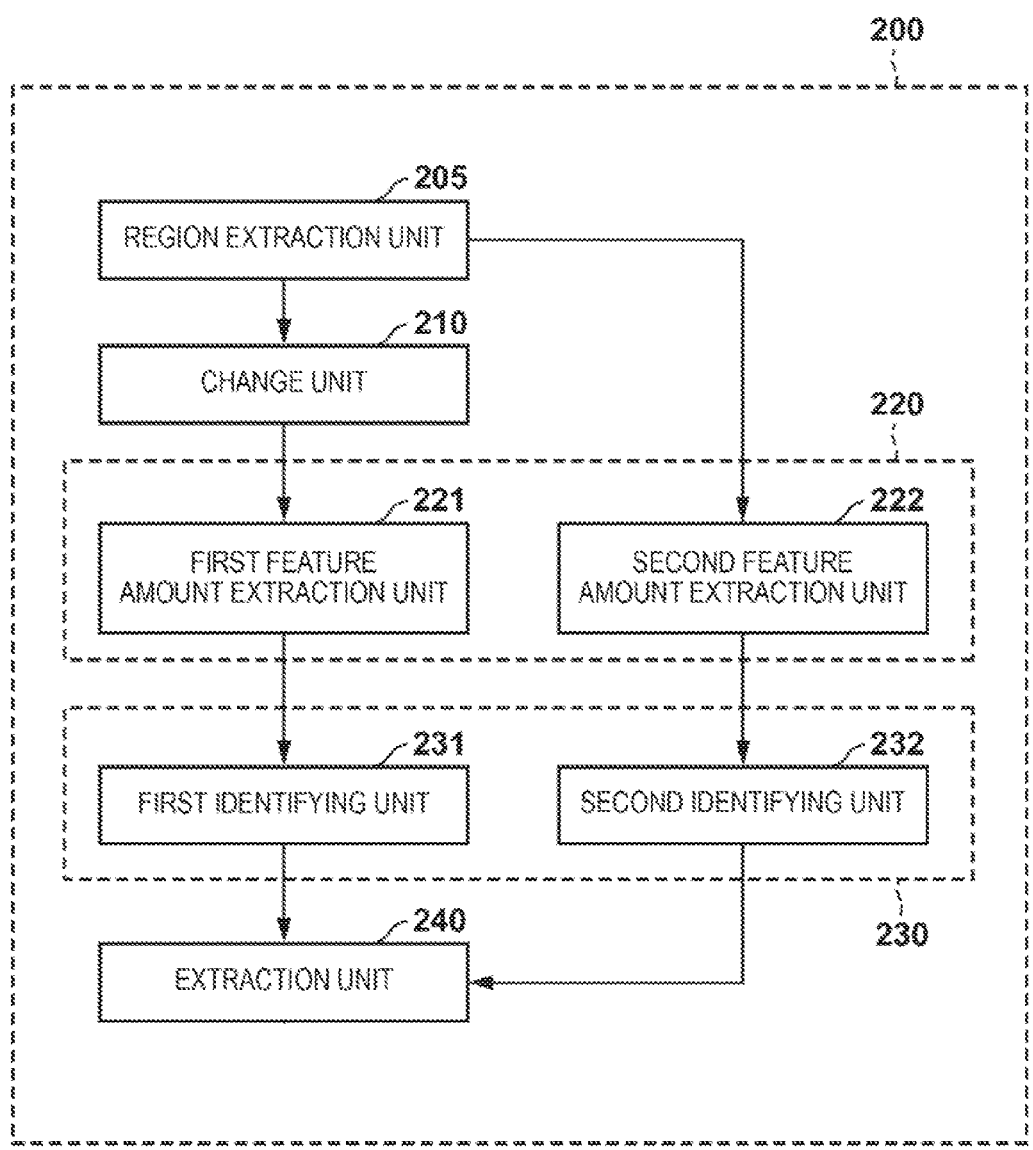
FIG. 5 is a block diagram showing the configuration of a first processing unit.
Figure 6:
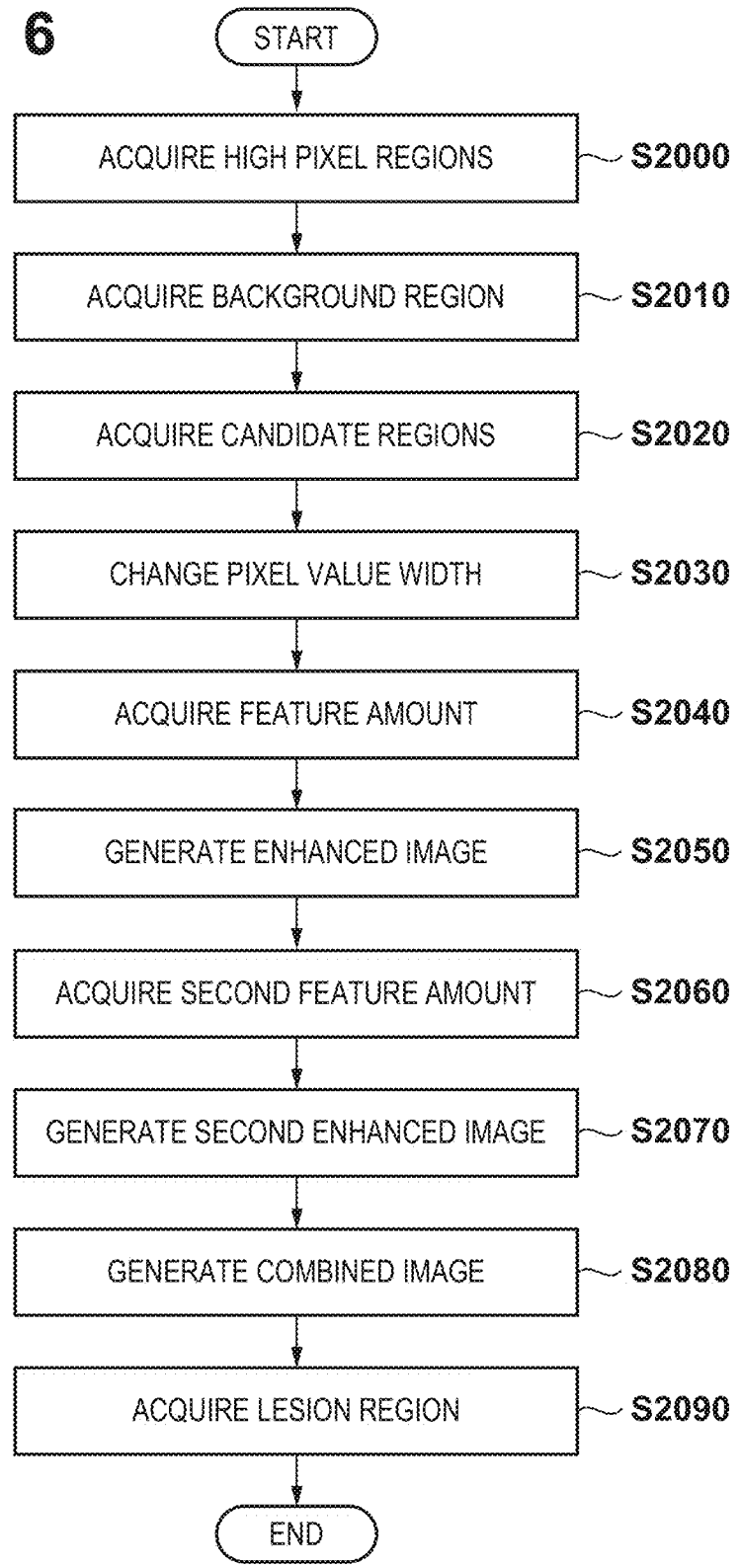
FIG. 6 is a flowchart showing processing by the first processing unit.
Figure 7:
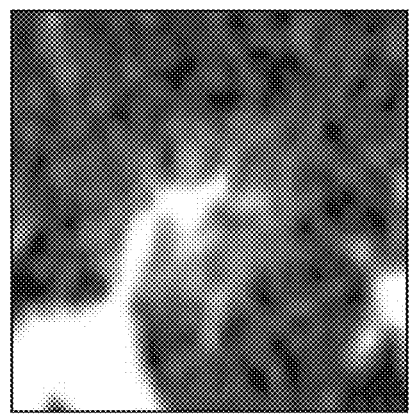
FIG. 7 is a view showing an image of a case of "Mixed GGO"
Figure 8:
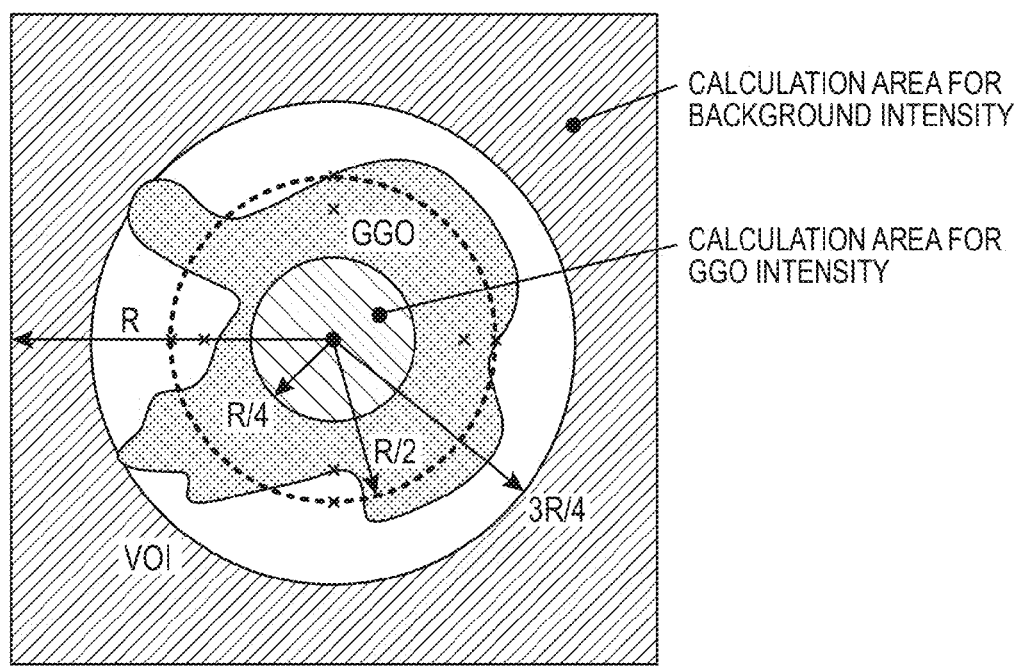
FIG. 8 is a view for explaining a region identifying method.
Figure 9:
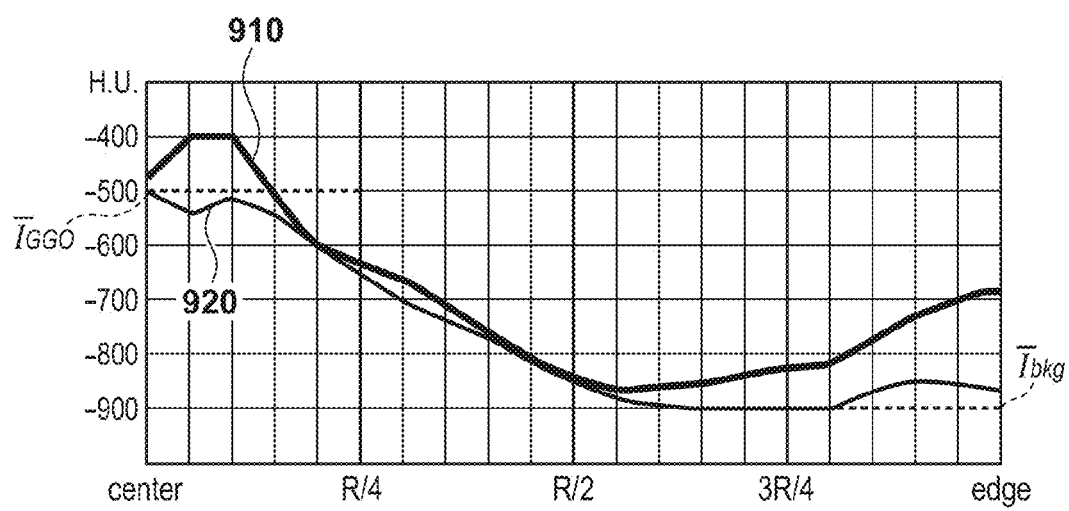
FIG. 9 is a graph for explaining a change in pixel value range.

FIG. 5 is a block diagram showing the configuration of the first processing unit 200. FIG. 6 is a flowchart showing the sequence of processing by the first processing unit 200. FIG. 7 shows a "Mixed GGO" image. FIGS. 8 and 9 are views for explaining processing of dividing a density region. Referring to FIG. 5, a region extraction unit 205 extracts low density regions (low pixel value regions) and high density regions (high pixel value regions) from region information obtained by a VOI acquisition unit 120. In an image which represents a nodule, the density of black increases as the low density region (low pixel value region) has a lower density, and the density of black decreases to be closer to white as the high density region (high pixel value region) has a higher density.

A change unit 210 changes the pixel value of a region candidate of a ground glass opacity as a light shade extracted by the region extraction unit 205 into a predetermined pixel value range.

A feature amount extraction unit 220 obtains a feature amount from an image obtained by changing the pixel value range obtained by the region extraction unit 205, or an image obtained by not changing the pixel value. Also, the feature amount extraction unit 220 includes a first feature amount extraction unit 221 which obtains a feature amount from an image obtained by changing the pixel value range, and a second feature amount extraction unit 222 which obtains a second feature amount from an image obtained by not changing the pixel value range.

Processing by the first processing unit 200 will be described below in accordance with the sequence of processing shown in FIG. 6.

(S2000)

First, in step S2000, the VOI acquisition unit 120 extracts a region almost corresponding to the center of a nodule at a size of about 2×. Note that when manual input is selected, region information is manually input via, for example, a mouse 15. Since a VOI is set to have a size of about 2×, the boundary of a GGO nodule is present close to a position an R/2 (R is ½ of the side length of the VOI) from the center of the VOI, as shown in FIG. 8. Therefore, the region extraction unit 205 obtains $\bar{I}_{GGO}$ from a region that falls within a distance of R/4 from the center, and $\bar{I}_{bkg}$ from a region that falls outside a distance of 3R/4 from the center.

First, using a threshold ($\theta_{th}$=−194) for removing high density regions, not only, for example, the core in the GGO but also, for example, the blood vessel region in the background is also removed from the entire VOI. The region extraction unit 205 determines a region having a threshold ($\theta_{th}$=−194) or more as a core region.

(S2010)

In step S2010, the VOI is divided into annular regions (its center coincides with that of the VOI) with a width of one pixel to obtain the average density (average pixel value) of each annular region. FIG. 9 illustrates an example of the average density of each annular region obtained for an image by threshold processing for the image shown in FIG. 7. The abscissa indicates the distance from the center. A solid line (upper side) 910 on the high density side indicates the density before high density regions are removed, and a lower solid line 920 indicates the density after these regions are removed. Then, $\bar{I}_{bkg}$ is obtained as the maximum value of the average density in an annular region that falls within a distance of R/4 from the center is set to $\bar{I}_{GGO}$, and the minimum value of the average of an annular region density region that falls within a distance of 3R/4 to R from the center is set to the pixel value of the background region. Note that a region having $\bar{I}_{bkg}$ or less is determined as a background region candidate.

(S2020)

In step S2020, the region extraction unit 205 extracts an image region having a value of $\bar{I}_{GGO}$ to $\bar{I}_{bkg}$ as a candidate region for a ground glass opacity region.

(S2030)

In step S2030, the change unit 210 changes the pixel value range of the low density regions (low pixel value regions) extracted by the region extraction unit 205 as per:

$$I'=600\cdot(I-\bar{I}_{bkg})/(\bar{I}_{GGO}-\bar{I}_{bkg})-800 \quad (1)$$

FIGS. 10A to 10C show images obtained by normalization processing for a nodule as change processing of the above-mentioned pixel value distribution. FIGS. 10A and 10B illustrate examples of normalization processing of "Pure GGO", and FIG. 10C illustrates an example of normalization processing of "Mixed GGO". With this operation, the change unit 210 reduces variations in density value of the GGO region and background region between images.

(S2040)

In step S2040, the feature amount extraction unit 220 (feature amount calculation unit) extracts a first texture feature amount as a first feature amount from each image. The first feature amount extraction unit 221 calculates a first feature amount from an image obtained by changing the pixel value distribution to a predetermined pixel value range.

The first feature amount extraction unit 221 calculates a first feature amount from the VOI after the above-mentioned density normalization. A texture statistics is used as a concrete feature amount. For example, 15 types of Haralick texture statistics obtained from a co-occurrence matrix are adopted. Since the Haralick texture statics is known as it is described in, for example, non-patent literature 5, a description thereof will not be given. FIG. 11 illustrates an example of the original CT image, and the texture feature amounts extracted by the feature amount extraction unit 220. A first feature amount is calculated for each pixel which constitutes image data from a predetermined range including pixels.

The co-occurrence matrix has variations of two types of gray scales (8 and 24 gray scales), two displacements (1 and 2 pixels), and two ROI sizes (3×3×3 and 7×7×7 pixels), and the feature amount extraction unit 220 performs calculation for 18 directions.

Also, in calculating 15 types of feature amounts, three directional statistics (the minimum, maximum, and average values of feature amounts in 18 directions) are obtained. Therefore, the texture feature amount of each pixel is a 360 (=2×2×2×15×3)-dimensional vector.

(S2050)

In step S2050, an identifying unit 230 independently obtains an enhanced image. Note that the identifying unit 230 includes a first identifying unit 231 corresponding to a ground glass opacity as a light shade, and a second identifying unit 232 corresponding to a substantial portion that forms the core. An identifying unit robust against outliers for the feature vector is used as the first identifying unit 231. The first identifying unit 231 is, for example, a low density identifier obtained by learning (to be described later) the respective regions of low and high densities, independently of each other, using MadaBoost. Since MadaBoost is a known technique described in, for example, non-patent literatures 6 and 7, a description thereof will not be given. The first identifying unit 231 receives a feature amount obtained by the first feature amount extraction unit 221 to obtain an image having undergone region enhancement.

(S2060)

In step S2060, the second feature amount extraction unit 222 calculates a second texture feature amount as a second feature amount from an image obtained by not changing the pixel value distribution. The second feature amount extraction unit 222 calculates a second texture feature amount from a VOI not to be normalized. As a concrete second feature amount, 15 types of Haralick texture statistics obtained from a co-occurrence matrix are adopted. The co-occurrence matrix has variations of two types of gray scales (8 and 24 gray scales), two displacements (1 and 2 pixels), and two ROI sizes (3×3×3 and 7×7×7 pixels), and the second feature amount extraction unit 222 performs calculation for 18 directions.

Also, in calculating 15 types of feature amounts, three directional statistics (the minimum, maximum, and average values of feature amounts in 18 directions) are obtained. Therefore, the texture feature amount of each pixel is a 360 (=2×2×2×15×3)-dimensional vector. FIG. 11 illustrates an example of the original CT image, and the texture feature amounts extracted by the feature amount extraction unit 220.

(S2070)

In step S2070, the second identifying unit 232 is, for example, a high density identifier obtained by learning (to be described later) the respective regions of low and high densities, independently of each other, using MadaBoost robust against outliers for the feature vector. The second identifying unit 232 receives a feature amount obtained by the second feature amount extraction unit 222 to perform region enhancement.

Note that the output value of the identifying unit 230 itself is determined as an enhancement result without performing threshold processing. FIGS. 12A and 12B illustrate examples of the enhancement results of respective regions as examples of images in which the target regions are selectively enhanced. With this operation, the target regions are selectively enhanced.

On the other hand, an extraction unit 240 (to be described later) can obtain the information of a ground glass opacity region rougher than graph cuts (to be described later) by threshold processing for the output value of the first identifying unit 231 as well. Also, the extraction unit 240 (to be described later) can obtain core region information rougher than graph cuts (to be described later) by threshold processing for the image enhanced by the second identifying unit 232. These extraction methods are useful in, for example, deriving a rough temporal change rate of the nodule size. Hence, these extraction methods can be used in accordance with the purpose of use while switching them with highly accurate extraction using graph cuts (to be described later).

(S2080)

In step S2080, the maximum values of two enhancement results obtained by the first identifying unit 231 and second identifying unit 232 are obtained for each pixel to obtain a combined image as the enhancement result of the entire GGO nodule region. FIG. 12C illustrates an example of such a combined image.

(S2090)

In step S2090, the extraction unit 240 obtains a GGO region from the combined image. The extraction unit 240 performs, for example, region extraction processing using graph cuts. This processing is based on energy minimization. The likelihood of the region interior and the certainty of the boundary can be reflected with good balance to allow global energy optimization. Also, this processing is advantageous in terms of ease of extension to multidimensional data.

As for an object with a known shape, the extraction accuracy can further be improved by setting an appropriate shape energy. In general, the energy is given by the linear sum of the region term and the boundary term as:

$$E(L) = \lambda \cdot \text{Region}(L) + \text{Boundary}(L) \quad (2)$$

where L is a label assigned to each element of the all-pixel set R, and represents a set expressed as:

$$l_{i \in R} \in \{\text{obj}, \text{bkg}\} \quad (3)$$

That is, the extraction unit 240 identifies a set of labels which minimize equation (2) as a nodule region obj and background region bkg.

Also, the region term and boundary term are expressed upon defining u and v as adjacent pixels (near 6 pixels this time) that fall within the distance R as:

$$\text{Region}(L) = \Sigma_{u \in R} f_u(l_u) \quad (4)$$

$$\text{Boundary}(L) = \Sigma_{(u,v) \in (R,R)} g_{u,v}(l_u, l_v) \quad (5)$$

where $f_u$ is the likelihood of the region, $g_{u,v}$ is a function describing the certainty of the boundary defined between adjacent pixel sets. In this example, the result of multiplying the logarithm of the likelihood (normal distribution approximate expression) of the enhancement result $B_u$ for each region by (−1) is set to $f_u$, and $g_{u,v}$ is set as a function obtained by exponential transformation of the square of the difference in enhancement result between adjacent pixels.

$$f_u(l_u) = -\log Pr(B_u | l_u) \quad (6)$$
$$= -\ln(1/\sqrt{(2\pi\sigma_{l_u}^2)}) + (B_u - \mu_{l_u})/2\sigma_{l_u}^2$$

$$g_{u,v}(l_u, l_v) = \begin{cases} e^{\left(\frac{(B_u - B_v)^2}{\sigma^2}\right)} & (\text{if } l_u \neq l_v) \\ 0 & (\text{if } l_u = l_v) \end{cases} \quad (7)$$

where $B_u$ and $B_v$ are the values of pixels u and v enhanced by the first identifying unit 231 and second identifying unit 232, and $\mu_{l_u}$ and $\sigma_{l_u}^2$ are the average and variance values, respectively, of a seed region of the label 1 $_{l_u}$.

Further, in graph cuts of the extraction unit 240, the seed of a graphics is a voxel that falls within a distance of 0.15

R (R is ½ of the maximum side length of the VOI) from the center of the VOI, and the sheet of the background is a voxel that falls within a distance of 0.1 R from the boundary of the VOI. Thresholds for these distances are determined by experiments. With this operation, a label is assigned to each pixel of image data, and the coordinate information of pixels assigned with the label of the nodule region obj is obtained as lesion region information. The thus combined enhanced image is processed by graph cuts to produce an effect of obtaining GGO region information.

(Learning of Identifying Unit 230)

Learning of the identifying unit 230, and a process of learning parameters of graph cuts will be described herein. The learning uses data of only three Axial, Sagittal, and Coronal cross-sections that pass through the nodule center.

The procedure of learning of the identifying unit 230 will be described below. First, a texture feature amount extracted by the feature amount extraction unit 220 is obtained for correct answer regions (three sections) of the GGO nodule. Note that a feature amount is three-dimensionally measured using adjacent slice information. The measured data is used for learning using MadaBoost and graph cuts. For example, as for MadaBoost, learning is performed to minimize loss for learned data. Also, as for graph cuts, the parameters $\lambda$ and $\sigma$ are changed within a certain range to select parameters that maximizes the performance of learned data. Note that this time parameter determination is done for each of groups of "Pure GGO", "Mixed GGO", and "Solid nodule" to build dedicated processing. That is, the boosting output as an input is changed between groups to determine optimum graph cut parameters for each output.

As described above, according to the present invention, it is possible to provide a mechanism of accurately extracting a lesion having a light shade (for example, a ground glass opacity).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-173396, filed Aug. 3, 2012, which is hereby incorporated by reference herein in its entirety.

What is claimed is:

1. An image processing apparatus which identifies a lesion from an image, the apparatus comprising:
   one or more processors: and
   at lease one memory coupled to the one or more processors, the at least one memory having instructions stored thereon which, when executed by the one or more processors, cause the image processing apparatus to:
   divide the image into a first candidate region including a core region, and a second candidate region including a ground glass opacity, wherein the first candidate region is adjacent to the second candidate region, and the first candidate region is different from the second candidate region,
   perform enhancement processing of pixel values of the second candidate region so as to increase a difference between pixel values of the second candidate region and pixel values in a background region,
   obtain combined data representing the first candidate region and data representing the second candidate region, based on pixel values of the first candidate region and the processed pixel values of the second candidate region, and
   identify, based on the combined data, a lesion including both the core region and the ground glass opacity, each being distinguished from the background region.

2. The apparatus according to claim 1, wherein the at least one memory has further instructions stored thereon which, when executed by the one or more processors, cause the apparatus to extract the first candidate region in which pixel values are higher than a threshold, and the second candidate region in which pixel values are lower than the threshold.

3. The apparatus according to claim 2, wherein the at least one memory has further instructions stored thereon which, when executed by the one or more processors, cause the apparatus to identify by:
   obtaining a first feature amount from the processed pixel values of the second candidate region;
   obtaining a second feature amount from the pixel values of the first candidate region; and
   outputting a first value corresponding to the first feature amount, and outputting a second value corresponding to the second feature amount,
   wherein the combined data is obtained based on the first value and the second value,
   wherein the first feature amount includes a purality of texture feature amounts calculated for each pixel from the second candidate region, the pixel value of which is processed, and is obtained based on statistics of a pixel value in a predetermined range including the pixel, and
   wherein the second feature amount includes a purality of texture feature amounts calculated for each pixel from the first candidate region, and is obtained based on statistics of a pixel value in a predetermined range including the pixel.

4. The apparatus according to claim 3, wherein the first feature amount and the second feature amount include Haralick texture statistics.

5. The apparatus according to claim 3, wherein the at least one memory has further instructions stored thereon which, when executed by the one or more processors, cause the apparatus to identify by learning, as a correct answer in advance, the first feature amount calculated from a ground glass opacity region.

6. The apparatus according to claim 3, wherein the at least one memory has further instructions stored thereon which, when executed by the one or more processors, cause the apparatus to identify by learning, as a correct answer in advance, the second feature amount calculated from the core region serving as a high pixel value region.

7. The apparatus according to claim 1, wherein the at least one memory has further instructions stored thereon which, when executed by the one or more processors, cause the apparatus to identify by identifying a region of the lesion using a graph cut.

8. The apparatus according to claim 1, wherein the at least one memory has further instructions stored thereon which, when executed by the one or more processors, cause the apparatus to acquire an image including a region of the lesion as an image region of interest from an image of an object.

9. The apparatus according to claim 1, wherein the at least one memory has further instructions stored thereon which, when executed by the one or more processors; cause the apparatus to obtain the combined data by:
    obtaining a first feature amount from the processed pixel values of the second candidate region;
    obtaining a second feature amount from the pixel values of the first candidate region;
    enhancing the pixel values of the first candidate region based on the obtained second feature amount to obtain first enhanced data;
    enhancing the processed pixel values of the second candidate region based on the obtained first feature amount to obtain second enhanced data; and
    combining the first enhanced data and the second enhanced data.

10. The apparatus according to claim 1, wherein the pixel values of the first candidate region are not increased.

11. The apparatus according to claim 1, wherein the image includes a region of interest.

12. The apparatus according to claim 1, wherein the at least one memory has further instructions stored thereon which, when executed by the one or more processors, cause the apparatus to identify by:
    obtaining a first feature amount from the changed pixel values of the second candidate region,
    obtaining a second feature amount from the pixel values of the first candidate region, and
    outputting a first value corresponding to the first feature amount, and outputting a second value corresponding to the second feature amount, and
    wherein the at least one memory has further instructions stored thereon which, when executed by the one or more processors, cause the apparatus to obtain the combined data based on the first value and the second value.

13. The apparatus according to claim 1, wherein the at least one memory has further instructions stored thereon which, when executed by the one or more processors, cause the apparatus to identify by:
    obtaining a first feature amount from the processed pixel values of the second candidate region,
    obtaining a second feature amount from the pixel values of the first candidate region, and
    outputting a first value corresponding to the first feature amount, and outputting a second value corresponding to the second feature amount,
    wherein the at least one memory has further instructions stored thereon which, when executed by the one or more processors, cause the apparatus to obtain the combined data based on the first value and the second value,
    wherein the first feature amount includes a plurality of texture feature amounts calculated from the processed pixel values, and
    wherein the second feature amount includes a plurality of texture feature amounts calculated from the pixel values of the first candidate region.

14. The apparatus according to claim 1, wherein the background region is not included in the second candidate region.

15. An image processing method of identifying a lesion from an image, the method comprising:
    dividing the image into a first candidate region including a core region, and a second candidate region including a ground glass opacity, wherein the first candidate region is adjacent to the second candidate region, and the first candidate region is different from the second candidate region,
    performing enhancement processing of pixel values of the second candidate region so as to increase a difference between pixel values of the second candidate region and pixel values in a background region,
    obtaining combined data from combining data representing the first candidate region and data representing the second candidate region, based on pixel values of the first candidate region and the processed pixel values of the second candidate region; and
    identifying, based on the combined data, a lesion including both the core region and the ground glass opacity, each being distinguished from the background region.

16. A non-transitory computer-readable storage medium storing a program which, when executed by one or more processors, cause an image processing apparatus, which identifies a lesion from an image, to:
    divide the image into a first candidate region including a core region, and a second candidate region including a ground glass opacity, wherein the first candidate region is adjacent to the second candidate region, and the first candidate region is different from the second candidate region;
    perform enhancement processing of pixel values of the second candidate region so as to increase a difference between pixel values of the second candidate region and pixel values in a background region;
    obtain combined data from combining data representing the first candidate region and data representing the second candidate region, based on pixel values of the first candidate region and the processed pixel values of the second candidate region; and
    identify, based on the combined data; a lesion including both the core region and the ground glass opacity, each being distinguished from the background region.

17. An image processing method of extracting a lesion having a ground glass opacity and a core region from an image, the method comprising:
    performing enhancement processing of pixel values included in a pixel value range of a candidate region for the ground glass opacity so as to increase a difference between pixel values of the candidate region and pixel values in a background region, wherein the candidate region for the ground glass opacity is an image region made with image pixels with values between a low background pixel value and a high pixel value, wherein the candidate region is adjacent to the core region;
    obtaining a first feature amount from the image after the pixel values included in the pixel value range is increased;
    obtaining a second feature amount from the core region of the image before the pixel value range is changed; and
    extracting the lesion from the image based on the first feature amount and the second feature amount,
    wherein the extracting comprises outputting a first value corresponding to the first feature amount, and outputting a second value corresponding to the second feature amount, and wherein the extracting is configured to generate an enhanced image based on the first value and the second value, and to extract the lesion from the enhanced image.

18. An image processing method of extracting a lesion having a ground glass opacity and a core region from an image, the method comprising:
performing enhancement processing of pixel values included in a pixel value range of a candidate region for the ground glass opacity so as to increase a difference between pixel values of the candidate region and pixel values in a background region, wherein the candidate region for the ground glass opacity is an image region made with image pixels with values between a low background pixel value and a high pixel value, wherein the candidate region is adjacent to the core region;
obtaining a first feature amount from the image after the pixel values included in the pixel value range is increased;
obtaining a second feature amount from the core region of the image before the pixel value range is changed;
extracting the lesion from the image based on the first feature amount and the second feature amount;
obtaining an image representing the ground glass opacity based on the first feature amount and an image representing the core region based on the second feature amount;
generating an enhanced image by combining the image representing the ground glass opacity and the image representing the core region; and
extracting the lesion from the enhanced image.

19. An image processing apparatus which identifies a lesion from an image, the image processing apparatus comprising:
one or more processors; and
at least one memory coupled to the one or more processors, the at least one memory having instructions stored thereon which, when executed by the one or more processors, cause the image processing apparatus to:
obtain a second candidate region including a ground glass opacity, wherein the second candidate region is adjacent to a first candidate region including a core region, and the second candidate region is different from the first candidate region,
perform enhanced processing of pixel values of the second candidate region so as to increase a difference between pixel values of the second candidate region and pixel values in a background region, and
identify, based on the processed pixel values of the second candidate region, a lesion including both the core region and the ground glass opacity, each being distinguished from the background region.

20. The apparatus according to claim 19, wherein the background region is not included in the second candidate region.

21. An image processing apparatus which identifies a lesion from an image, the image processing apparatus comprising:
one or more processors; and
at least one memory coupled to the one or more processors, the at least one memory having instructions stored thereon which, when executed by the one or more processors, cause the image processing apparatus to:
divide the image into a first candidate region including a core region, and a second candidate region including a ground glass opacity, wherein the first candidate region is adjacent to the second candidate region, and the first candidate region is surrounded by the second candidate region and is different from the second candidate region;
perform normalization processing of pixel values of the second candidate region, wherein the normalization processing is not performed on pixel values of the first candidate region;
obtain combined data representing the first candidate region and data representing the second candidate region, based on pixel values of the first candidate region on which the normalization processing is not performed and the processed pixel values of the second candidate region; and
identify, based on the combined data, a lesion including both the core region and the ground glass opacity, each being distinguished from a background region.

22. An image processing method of identifying a lesion from an image, the method comprising:
obtaining a second candidate region including a ground glass opacity, wherein the second candidate region is adjacent to a first candidate region including a core region, and the second candidate region is different from the first candidate region;
performing enhanced processing of pixel values of the second candidate region so as to increase a difference between pixel values of the second candidate region and pixel values in a background region; and
identifying, based on the processed pixel values of the second candidate region, a lesion including both the core region and the ground glass opacity, each being distinguished from the background region.

* * * * *